Patented Aug. 5, 1947

UNITED STATES PATENT OFFICE 2,425,045

ORIENTED POLYSULFIDE POLYMERS

Joseph C. Patrick, Morrisville, Pa., assignor to Thiokol Corporation, Trenton, N. J., a corporation of Delaware No Drawing. Application June 9, 1943, Serial No. 490,190

8 Claims. (Cl. 18—48)

This invention relates to polysulfide polymers.

It is an object of the invention to increase the tensile strength of polysulfide polymers by orientation or alinement of the molecules of linear polysulfide polymers.

It is a further object to discover a principle for ascertaining those polysulfide polymers which are susceptible to orientation and, having discovered or invented this principle, to apply it.

In the art of polymer orientation the polymer is heated to a temperature at which it becomes highly extensible and elongated under tension. It is then cooled while maintaining it under tension. The molecules which normally have a random relationship thereby become oriented or alined and thereby acquire new properties.

It has been discovered that there are certain criteria which a polysulfide polymer must meet in order to be susceptible of the orientation above described and to possess useful rubbery properties at temperatures encountered in use, e. g., 0° C. to 90° C. as follows:

First, a linear polymer.

Secondly, a predominance of —S—S— linkages.

Thirdly, the ability of being highly extensible under tension at temperatures of about 100° C. to 200° C.

Fourthly, the ability when cooled to about 0° C. to 90° C. to retain the orientation caused by stretching and cooling under tension.

It has been discovered that the predominant factor in attaining the third and fourth criteria above mentioned is a proper spacing of the —S—S— linkages.

It is known that in linear polysulfide polymers of the disulfide type, the —SS— groups or linkages alternate with intervening organic groups, and by spacing of the —SS— linkages is meant the number of atoms (e. g. carbon atoms or carbon and oxygen atoms or carbon and other atoms) between the —SS— groups.

It is not meant that there must necessarily be a predetermined number of atoms between all the —SS— groups but rather that, among the myriads of molecules composing a given mass of polymer, the average spacing should be within certain statistical limits which has been ascertained to be from about 2.2 to about 3.6 atoms.

In some of the molecules the spacing may be much more and in others substantially less than this value, but the average spacing in all the molecules should be within the above range.

It will be seen that in a polymer made entirely from ethylene dichloride, for example, the spacing between the —SS— groups is two atoms and therefore outside the above range. In a polymer made from BB' dichlor ethyl ether, the spacing is five atoms and therefore outside the range. This will be apparent from a consideration of the units of said polymers which are as follows:

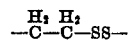

and

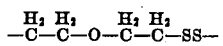

Stated more broadly, if the polymer is made up of units

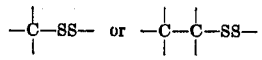

the spacing between the —SS— groups is one atom or two atoms and therefore outside the range; and in a polymer made up of units

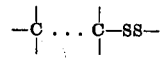

(where

represents carbon atoms separated by intervening atomic structure) having more than one intervening atom between the carbon atoms, the spacing between the —SS— groups is more than 3.6 and therefore outside the range.

However, by making a copolymer characterized by chains made up of the units

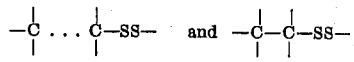

or made up of the units

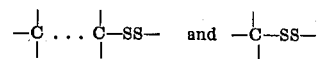

in which copolymer said units are suitably distributed, the average spacing of the —SS— groups may be brought within the said range of 2.2 to 3.6.

Said copolymers may be made by copolymerizing compounds having the formulae

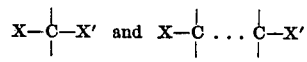

or

where X and X' are functional groups, i. e., substituents split off by reaction with an alkaline sulfide or polysulfide, or —SH groups to be condensed by oxidation. I am not claiming herein the general technique of said copolymerization which is fully disclosed and claimed in my copending application Serial No. 267,389, filed April 12, 1939, now U. S. Patent 2,363,614, issued November 28, 1944, to which reference is made, and therefore need not explain this technique herein, in detail. See also Patrick U. S. Patent 2,221,650.

According to the present invention, the suitable proportioning of the units (a) 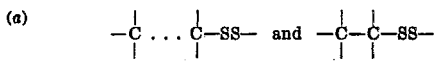

or (b) 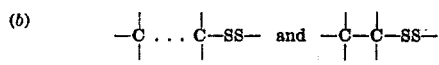

or (c) 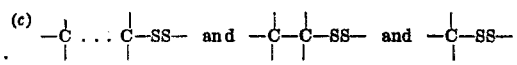

and in any given copolymer may be effected by using suitable proportions of the above mentioned polyfunctional compounds.

Those properties may be determined in accordance with the following formula $$\frac{(Sa \times Na)+(Sb \times Nb)}{Na+Nb}=P$$

where $Sa$ = spacing of —SS— groups due to compound $a$
$Sb$ = spacing of —SS— groups due to compound $b$
$Na$ = number of mols of compound $a$
$Nb$ = number of mols of compound $b$
$P$ = average spacing of —SS— groups in the copolymer.

To illustrate the application of this formula consider the preparation of a polymer in which it is desired that the spacing of the —SS— groups shall be three.

One way of doing this would be to take any compound having the formula

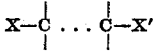

where there is one atom, e. g. oxygen or sulfur, intervening between the two carbon atoms, such as

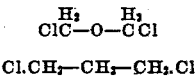

Cl.CH₂—CH₂—CH₂.Cl etc.

Another way, however, is to apply the above formula to the preparation of a copolymer from compounds having the skeleton carbon structure above set forth.

Consider, for example, the application of the said formula to the preparation of a copolymer from ββ' dichloro diethyl formal Cl.CH₂.CH₂.O.CH₂.O.CH₂.CH₂.Cl and ethylene dichloride and let the formal be identified as compound $b$ and the ethylene dichloride as compound $a$. Then $$Sa=2$$
$$Sb=7$$
$$Na=\text{unknown}$$
$$Nb=\text{unknown}$$
$$\frac{(2 \times Na)+(7 \times Nb)}{Na+Nb}=3$$

Therefore $$2Na+7Nb=3Na+3Nb$$

and $$4Nb=1Na$$

Therefore

Therefore the ratio of formal to ethylene dichloride is 1 to 4.

As above noted, these proportions give a product in which the average spacing of the —SS— groups is 3. The preferred spacing range is 2.4 to 2.7.

It will be appreciated that in accordance with the generic aspects of the invention and the attainment of the proper spacing of the —SS— groups, the specific structure of the organic polyfunctional compound is immaterial and that the important consideration is the selection of compounds in which the carbon atoms to which the functional groups are attached are so spaced as to give the proper average spacing of —SS— groups in the ultimate polymeric composition. It is therefore unnecessary to recite any specific compound or compounds other than to illustrate how the invention may be practiced. For this purely illustrative purpose the following example is given:

3 liters of a two molar solution of sodium tetrasulfide are placed in a flask equipped with suitable means of agitation, thermometer and reflux condenser. 10 grams of sodium hydroxide are added thereto, followed by 25 grams crystallized magnesium chloride. The polysulfide is heated to a temperature of about 160° F. and a mixture of 4 mols (396 grams) of ethylene dichloride and 173 grams (1 mol) of formal are added at such a rate that about one hour is required for the complete addition of the mixture of organic halides.

The copolymeric reaction product is obtained in the form of a latex which is settled out and separated from the supernatant liquid and then washed. The product is then subjected to a desulfurizing treatment to convert it to the disulfide form by the addition of 6 mols (240 grams) of sodium hydroxide and heated for about thirty minutes. The latex is allowed to settle out of the liquid which is removed by decantation, after which the latex is washed with water until free from water soluble impurities. The polymer is then separated from the purified latex by any suitable means.

The resulting polymer is then subjected to a treatment to orient it, in the following manner.

The polymer is heated to a temperature of about 130° C., after which it is placed under tension of such magnitude that an extension or elongation of about five times its original length takes place, after which it is cooled, still retaining the tension and the stretch caused thereby, to a temperature of about 25° C., whereupon if the tension is removed complete retraction will not take place and the polymer will remain in a stretched or oriented condition. The original polymer which had a tensile strength on test of around 400 to 500 pounds showed a tensile strength of 2,000 to 3,000 pounds per square inch after the orientation produced as described above.

It will thus be seen that the present invention makes possible a tremendous increase in the valuable property of tensile strength. It may also be noted that at least in some cases substantial improvements in electrical properties have been noted, particularly dielectric strength and power factor.

It will be noted that to obtain the spacing claimed and described herein, except where the spacing is the whole number 3, use of copolymerization technique is necessary.

I claim:
1. Process which comprises heating a linear polysulfide polymer to a temperature of about 100° C. to 200° C., stretching the polymer under tension and cooling the polymer to a temperature substantially less than about 100° C. while maintaining it under tension; said polymer being characterized by a predominance of —SS— linkages alternating with intervening organic groups, the average statistical spacing of said —SS— linkages being from about 2.2 to about 3.6 intervening atoms.

2. Process which comprises heating a polysulfide polymer to a temperature of about 100° C. to 200° C., stretching the polymer under tension and cooling the polymer to a temperature substantially less than about 100° C. while maintaining it under tension; said polymer being a linear copolymer characterized by chains made up of the units

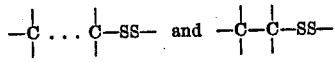

where

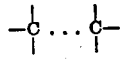

represents carbon atoms separated by intervening atomic structure and

represents adjacent carbon atoms, the average statistical spacing of said —SS— linkages being from about 2.2 to about 3.6 intervening atoms.

3. Process which comprises heating a polysulfide polymer to a temperature of about 100° C. to 200° C., stretching the polymer under tension and cooling the polymer to a temperature substantially less than about 100° C. while maintaining it under tension; said polymer being a linear copolymer characterized by chains made up of the units

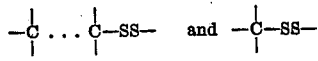

where

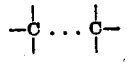

represents carbon atoms separated by intervening atomic structure and

represents a single carbon atom the average statistical spacing of said —SS— groups being from about 2.2 to about 3.6 intervening atoms.

4. Process which comprises heating a polysulfide polymer to a temperature of about 100° C. to 200° C., stretching the polymer under tension and cooling the polymer to a temperature substantially less than about 100° C. while maintaining it under tension; said polymer being a linear copolymer characterized by chains made up of units of the group

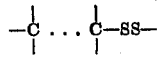

representing two carbon atoms separated by intervening atomic structure, the average statistical spacing of said —SS— linkages being from about 2.2 to about 3.6 intervening atoms.

5. A linear oriented polysulfide polymer, said polymer being characterized by a predominance of —SS— linkages alternating with intervening organic groups, the average statistical spacing of said —SS— linkages being from about 2.2 to about 3.6 intervening atoms.

6. An oriented polysulfide polymer, said polymer being a linear copolymer characterized by oriented chains made up of the units

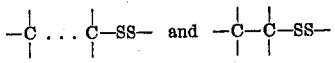

where

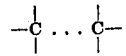

represents carbon atoms separated by intervening atomic structure and

represents adjacent carbon atoms, the average statistical spacing of said —SS— linkages being from about 2.2 to about 3.6 intervening atoms.

7. A polysulfide polymer, said polymer being a linear oriented copolymer characterized by oriented chains made up of the units

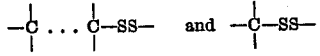

where

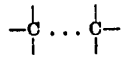

represents carbon atoms separated by intervening atomic structure and

represents a single carbon atom, the average statistical spacing of said —SS— groups being from about 2.2 to about 3.6 intervening atoms.

8. A polysulfide polymer, said polymer being a linear oriented copolymer characterized by chains made up of units of the group

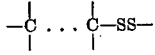

representing two carbon atoms separated by intervening atomic structure, the average statistical spacing of said —SS— linkages being from about 2.2 to about 3.6 intervening atoms.

JOSEPH C. PATRICK.

REFERENCES CITED

The following references are of record in the file of this patent:

UNITED STATES PATENTS

| Number | Name | Date |
| --- | --- | --- |
| 1,890,191 | Patrick | Dec. 6, 1932 |
| 2,231,769 | Merrill | Feb. 11, 1941 |
| 2,195,380 | Patrick | Mar. 26, 1940 |
| 2,221,650 | Patrick | Nov. 12, 1940 |
| 2,216,044 | Patrick | Sept. 24, 1940 |
| 1,846,810 | Lewis | Feb. 23, 1932 |
| 2,079,943 | Lobdell | May 11, 1937 |
| 2,071,251 | Carothers | Feb. 16, 1937 |
| 1,923,392 | Patrick | Aug. 22, 1933 |
| 1,950,744 | Patrick | Mar. 13, 1934 |
| 1,981,968 | Patrick | Nov. 27, 1934 |
| 2,012,347 | Patrick | Aug. 27, 1935 |
| 2,049,974 | Patrick | Aug. 4, 1936 |
| 2,126,818 | Sager | Aug. 16, 1938 |
| 2,108,759 | Turman | Feb. 15, 1938 |

FOREIGN PATENTS

| Number | Country | Date |
| --- | --- | --- |
| 419,826 | Great Britain | Nov. 19, 1934 |

OTHER REFERENCES

India Rubber World, April 1940, pp. 51–53.